(12) United States Patent
Yokoyama (10) Patent No.: US 12,298,502 B2
(45) Date of Patent: May 13, 2025

(54) VIRTUAL IMAGE DISPLAY DEVICE

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 818 days.

(21) Appl. No.: 17/389,358

(22) Filed: Jul. 30, 2021

(65) Prior Publication Data

US 2022/0035157 A1    Feb. 3, 2022

(30) Foreign Application Priority Data

Jul. 30, 2020 (JP) ................ 2020-129075

(51) Int. Cl.

| | |
|---|---|
| G02B 27/01 | (2006.01) |
| F21V 8/00 | (2006.01) |
| G02B 5/18 | (2006.01) |
| G02B 5/32 | (2006.01) |
| G02B 27/42 | (2006.01) |

(52) U.S. Cl.
CPC ....... G02B 27/0101 (2013.01); G02B 5/1866 (2013.01); G02B 5/32 (2013.01); G02B 6/005 (2013.01); G02B 27/4205 (2013.01)

(58) Field of Classification Search
CPC .... G02B 27/0101; G02B 5/1866; G02B 5/32; G02B 6/005; G02B 27/4205; G02B 27/286; G02B 5/1828; G02B 2027/0123; G02B 27/0081; G02B 27/0172; G02B 2027/0174

USPC ......................................... 359/569
See application file for complete search history.

(56) References Cited

U.S. PATENT DOCUMENTS

| | | | |
|---|---|---|---|
| 2014/0267636 | A1 | 9/2014 | Takagi et al. |
| 2017/0031161 | A1* | 2/2017 | Rossini ............. G02B 27/0101 |
| 2018/0373115 | A1 | 12/2018 | Brown et al. |
| 2019/0114950 | A1* | 4/2019 | Calm ..................... G09G 3/20 |
| 2021/0165224 | A1 | 6/2021 | Utsugi |

FOREIGN PATENT DOCUMENTS

| | | | | |
|---|---|---|---|---|
| EP | 3351996 A1 * | 7/2018 | ............ | G02B 27/02 |
| JP | 2014-132328 | 7/2014 | | |
| JP | 2015-099238 | 5/2015 | | |
| JP | 2015-118273 | 6/2015 | | |
| JP | 2015105990 | 6/2015 | | |
| JP | 2017062507 | 3/2017 | | |
| JP | 2020-038316 | 3/2020 | | |

* cited by examiner

*Primary Examiner* — Jyotsna V Dabbi
(74) *Attorney, Agent, or Firm* — JCIPRNET (57) ABSTRACT

Provided is a virtual image display device including an imaging light emitting device, a light-guiding member configured to guide imaging light emitted from the imaging light emitting device, and an emission-side diffraction element provided at a light-emitting portion of the light-guiding member and configured to emit the imaging light by diffraction. In the emission-side diffraction element, a light amount difference between a first component light and a second component light of the imaging light, the first component light being emitted as a central image at a first angle φ of 0° and the second component light being emitted as a peripheral image at a second angle φ of ±θ (θ>0°), is equal to or less than 20%.

13 Claims, 9 Drawing Sheets

VIRTUAL IMAGE DISPLAY DEVICE

The present application is based on, and claims priority from JP Application Serial Number 2020-129075, filed Jul. 30, 2020, the disclosure of which is hereby incorporated by reference herein in its entirety.

BACKGROUND

1. Technical Field

The present disclosure relates to a virtual image display device configured to present a virtual image to an observer (user).

2. Related Art

As a light-guiding plate of an image display device applicable as a virtual image display device, there is known, for example, a light-guiding plate in a light-guiding optical system provided with a hologram element that, when a region (eye-box) in which an observer (user) can visually recognize an image (virtual image) is expanded, is configured to make a diffraction efficiency of the hologram element non-uniform in order to make an intensity of a light beam emitted from the hologram element uniform (JP-A-2020-38316).

Nevertheless, in a light-guiding plate having a configuration such as that in JP-A-2020-38316, when the angle of view is widened, variations in luminance may occur depending on the position within the screen, that is, the angle of the emitted light, resulting in the occurrence of brightness unevenness and color unevenness.

SUMMARY

A virtual image display device according to an aspect of the present disclosure includes an imaging light emitting device configured to emit imaging light, a light-guiding member configured to guide the imaging light emitted from the imaging light emitting device, and an diffraction element provided at an emitting portion of the light-guiding member and configured to emit the imaging light by diffraction. In the diffraction element, a light amount difference between a first component light of the imaging light and a second component light of the imaging light is equal to or less than 20%, the first component light being emitted as a first angle, and the second component light being emitted as a second angle.

DESCRIPTION OF EXEMPLARY EMBODIMENTS

First Exemplary Embodiment

Below, an example of a virtual image display device according to a first exemplary embodiment of the present disclosure will be described with reference to the drawings.

Figure 1:
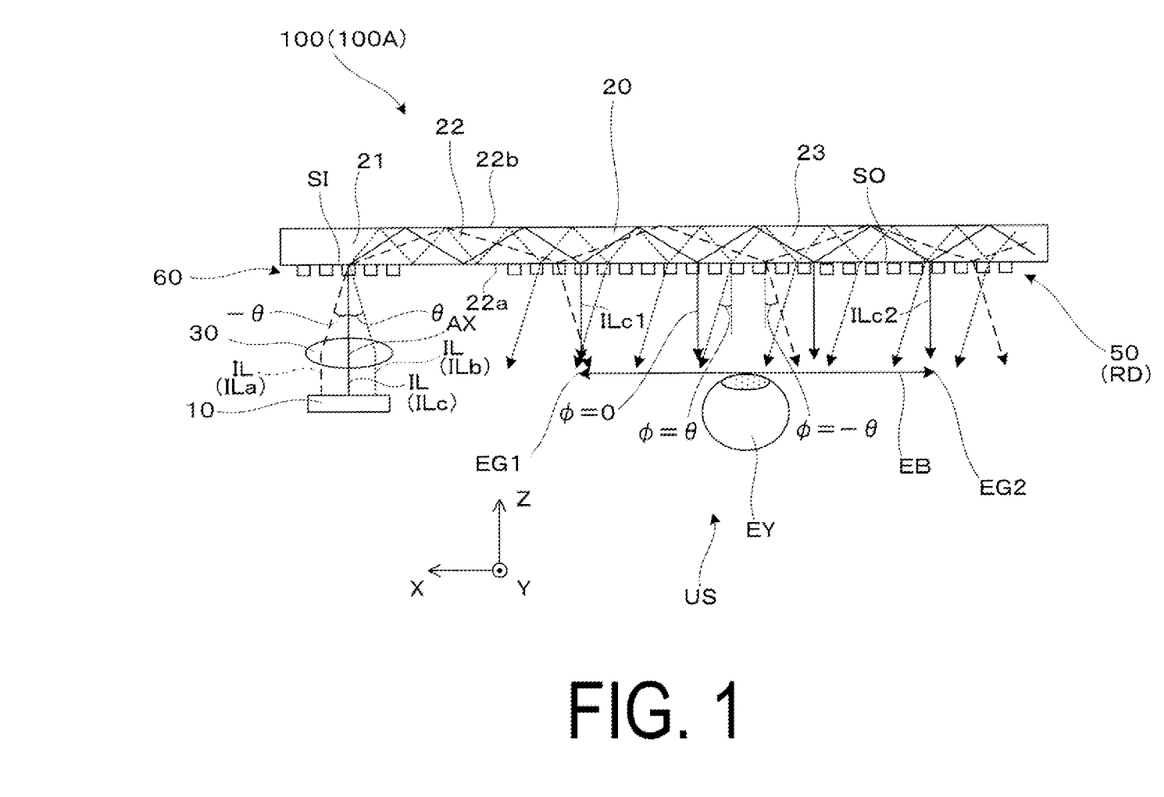
FIG. 1 is a conceptual plan view illustrating an optical configuration of a virtual image display device according to a first exemplary embodiment.

FIG. 1 is, as a conceptual view illustrating an optical configuration of a virtual image display device 100 according to this exemplary embodiment, a plan view illustrating a state in which imaging light IL is guided to an eye EY of an observer (user or wearer) US. FIG. 1 illustrates a case in which the imaging light IL is guided to, of the eyes EY of the observer US, a left eye.

Figure 2:
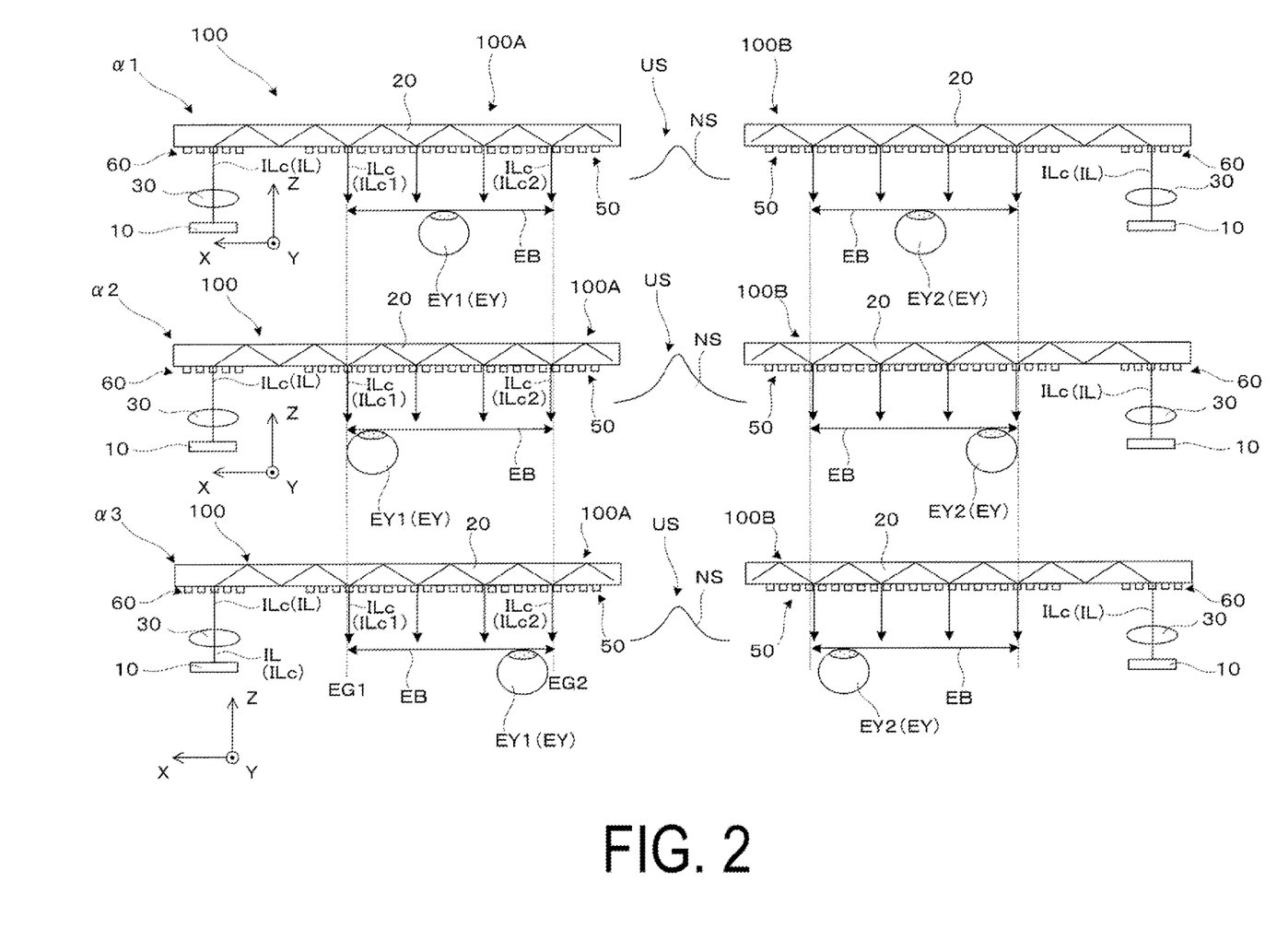
FIG. 2 is a conceptual view for describing a relationship between the virtual image display device and positions of eyes of an observer (user).

FIG. 2 is a conceptual view for describing a relationship between the virtual image display device 100 and positions of the eyes EY of the observer (user).

For example, as illustrated in FIG. 2, it is conceivable that the virtual image display device 100 according to this exemplary embodiment is constituted by a pair of left and right virtual image display devices 100A, 100B, and is used in a state of being mounted on a head of the observer US. The virtual image display device 100 functions as a head-mounted display apparatus configured to guide the imaging light IL to the left and right eyes EY (EY1, EY2), thereby allowing the observer US to visually recognize a virtual image. However, because the optical structure has left-right symmetry with the left and the right being similar in structure, the details of the structure of the virtual image display device 100 will be described only for a portion that guides the imaging light IL on the left eye side as illustrated in FIG. 1 and the like, and detailed description of the right eye side will be omitted.

Note that the virtual image display device 100 is an optical device capable of not only allowing the observer US to visually recognize a virtual image, but also to observe an external world image in a see-through manner.

Below, an example of the structure and the like of the virtual image display device 100 will be described with reference to FIG. 1 and the like. The virtual image display device 100 is an optical device including an imaging light emitting device 10, a collimator lens 30, a light-guiding member 20, an emission-side diffraction element 50, and an incident-side diffraction element 60, and guides the imaging light IL generated by the imaging light emitting device 10 to the eyes EY of the observer US, thereby allowing the observer US to visually recognize a virtual image.

Note that, in FIG. 1 and the like, X, Y, and Z are an orthogonal coordinate system, a ±Z direction indicates a direction parallel to an optical axis AX (optical axis of the collimator lens 30) in a direction in which the imaging light emitting device 10 and the collimator lens 30 are aligned, and a ±X direction and a ±Y direction indicate directions parallel to a rectangular panel surface constituting the imaging light emitting device 10, the ±X direction being parallel to a longitudinal direction and the ±Y direction being parallel to a lateral direction of the panel surface. Further, the ±X direction corresponds to a horizontal direction when the virtual image display device 100 is mounted, and the ±Y direction corresponds to a vertical direction when the virtual image display device 100 is mounted. That is, the +X direction corresponds to a transverse direction in which both eyes EY (refer to FIG. 2) of the observer US wearing the virtual image display device 100 are aligned, the +Y direction corresponds to an upward direction for the observer, orthogonal to the transverse direction in which both eyes EY are aligned, and the +Z direction corresponds to a frontward direction for the observer US or a front surface direction. Further, each direction can also be regarded as follows. For example, the ±Z direction is a direction parallel to a direction in which the imaging light IL emitted from a central pixel of the imaging light emitting device 10 is emitted from the light-guiding member 20 and directed toward an eye-box EB, the ±X direction is, for example, a direction parallel to a direction from the virtual image display device 100A for the left eye EY1 toward the virtual image display device 100B for the right eye EY2 illustrated in FIG. 2, and the ±Y direction is a direction orthogonal to the ±X direction and the ±Z direction.

The imaging light emitting device 10 is a display element (display device) that emits the imaging light IL to form an image corresponding to a virtual image, and is constituted by, for example, a liquid crystal display (liquid crystal display panel). Accordingly, the imaging light emitting device 10 can be configured to emit, as the imaging light IL, component light (linearly polarized light) polarized in a predetermined direction or light having the linear polarized light as the main component light, that is, the imaging light emitting device 10 is configured to include a polarized display element (polarized display device) that emits polarized light as the imaging light IL. In particular, in this exemplary embodiment, the state of polarization of the imaging light IL is, in the light emission obtained by utilizing diffraction in the emission-side diffraction element 50, in a direction of low diffraction efficiency. In other words, the imaging light emitting device 10 emits, as the imaging light, light polarized in a direction in which diffraction efficiency in the emission-side diffraction element 50 is low. Here, a "direction of low diffraction efficiency" refers to a low extraction efficiency of light in comparison to a case in which normal light that has not been polarized is diffracted by the emission-side diffraction element 50, for example, and will be described in detail later.

The collimator lens 30 is a projection lens constituted by a lens and the like for collimating incident light, and is configured to collimate the imaging light IL from the imaging light emitting device 10 and emit the imaging light IL having a width of a certain degree toward the light-guiding member 20. That is, the imaging light IL transmitted through the collimator lens 30 is incident on the light-guiding member 20 in a collimated state.

The light-guiding member 20 is a light-guiding plate or a light-guiding device (light-guiding optical system) that guides the imaging light IL from the collimator lens 30 to an area in front of the eyes of the observer by emitting, while also internally reflecting, the imaging light IL. The light-guiding member 20 is a plate member having optical transparency and including a light-incident portion 21 that captures the imaging light IL, a light-guiding portion 22 that is a parallel light guide body for guiding light, and a light-emitting portion 23 for extracting the imaging light IL from the light-guiding member 20. In the example illustrated, a flat surface including a light-incident surface SI of the light-incident portion 21 that captures the imaging light IL and a flat surface 22a, which is a front surface of the light-guiding portion 22, is disposed so that a direction along the optical axis AX, that is, the Z direction, is the normal direction. The light-incident portion 21 is disposed at an ear side (+X side) of the observer US, and the light-emitting portion 23 is disposed at a nose side (−X side) of the observer US. The light-incident portion 21, the light-guiding portion 22, and the light-emitting portion 23 are an integrated component or a single member molded by glass or a resin material having high optical transparency.

The light-incident portion 21 is a portion of the light-guiding member 20 on a light path upstream side provided facing the collimator lens 30, and introduces the imaging light IL emitted from the imaging light emitting device 10 and passed through the collimator lens 30 to an interior of the light-guiding member 20. The light-incident portion 21 includes the incident-side diffraction element 60 on the light-incident surface SI that captures the imaging light IL. That is, the light-guiding member 20 utilizes diffraction when capturing the imaging light IL at the light-incident portion 21. Note that the incident-side diffraction element 60 will be described later.

The light-guiding portion 22 is a flat plate portion that occupies an intermediate portion between the light-incident portion 21 and the light-emitting portion 23 in the light-guiding member 20, and includes two flat surfaces 22a, 22b facing each other that form a pair of surfaces extending in parallel. The light-guiding portion 22 functions as a total reflection surface which totally reflects the imaging light IL from the light-incident portion 21, and guides the imaging light IL to the light-emitting portion 23 with minimum loss. That is, the light-guiding portion 22 propagates the imaging light IL incident from the light-incident portion 21 to the light-emitting portion 23 by total reflection. Further, from a different point of view, the light-incident portion 21 bends the light path of the imaging light IL, making total reflection possible in the light-guiding portion 22. It should be noted that, because both flat surfaces 22a, 22b are parallel flat surfaces, the external world image is not magnified and a focus is not shifted. Further, the illustration is deformed from the viewpoint of clarity of description. For example, the light-guiding member 20 is actually thinner and, when the imaging light IL is introduced from the ear side (+X side) to the nose side (−X side) of the observer US, the total reflection as described above can be configured to be performed a greater number of times than in the illustrated case.

The light-emitting portion 23 is a portion of the light-guiding member 20 on a light path downstream side, and is configured to extract, from the light-guiding member 20, the imaging light IL passing through the light-guiding portion 22 and emit the imaging light IL toward the eye EY of the observer US. The light-emitting portion 23 has a flat plate shape following the light-guiding portion 22 and, similar to the light-guiding portion 22, propagates a portion of the imaging light IL by total reflection while extracting the other portion at a light emission surface SO. Furthermore, the light-emitting portion 23 includes the emission-side diffraction element 50 on the light emission surface SO that extracts the imaging light IL. That is, the light-guiding member 20 utilizes diffraction when extracting the imaging light IL at the light-emitting portion 23.

As described above, the emission-side diffraction element 50 is a member that is provided to the light-emitting portion 23 of the light-guiding member 20 and emits the imaging light IL from the light-guiding member 20 toward the eye EY of the observer US by diffraction and, in this example, is constituted by a surface relief-type diffraction grating RD formed with a plurality of grooves (slits) in a specific direction. More specifically, the large number of grooves (slits) constituting the emission-side diffraction element 50 as the surface relief-type diffraction grating RD have periodicity in the X direction and are formed in a linear pattern extending in the Y direction. That is, in the emission-side diffraction element 50 constituted by the surface relief-type diffraction grating RD, a grating period and a grating height are constant. Further, in the illustration, the size and the like of the large number of grooves (slits) are deformed from the viewpoint of clarity of description, and the grooves (slits) are actually finer and exist in greater number. Further, with respect to projections and depressions of the grooves (slits) as well, in addition to the illustrated example, various modes are possible. While, in the illustrated example, a surface with projections and depressions is formed on an outer surface side, no such limitation is intended and various modes can be adopted such as, for example, a structure having a surface with projections and depressions on an inner side.

A portion of the imaging light IL guided to the light-emitting portion 23 by total reflection in the light-emitting portion 23 is extracted from the light emission surface SO by the action of diffraction in the emission-side diffraction element 50, which is the surface relief-type diffraction grating RD provided on the light emission surface SO of the light-emitting portion 23, and emitted toward the eye EY of the observer US. On the other hand, the other portion of the imaging light IL is continuously totally reflected without being subjected to the action of diffraction in the emission-side diffraction element 50, is propagated to the nose side of the observer US (inner side) and, when incident on the light emission surface SO again, a portion thereof is extracted from the light emission surface SO and the other portion is totally reflected. With repetition of the operation described above, a region where the observer US can visually recognize a virtual image as an image can be expanded, that is, the eye-box EB can be secured to a certain degree or greater.

Note that, as described above, the incident-side diffraction element 60 is an element provided on the light-incident surface SI of the light-incident portion 21 and configured to capture the imaging light IL in an interior of the light-guiding member 20 by the action of diffraction and, as an example here, similarly to the emission-side diffraction element 50, conceivably may be a surface relief-type diffraction grating. In the incident-side diffraction element 60, in order to propagate the imaging light IL by total reflection, a grating period is determined so that the angle is larger than the critical angle determined by the refractive index of the light-guiding member 20. Note that, similarly to the emission-side diffraction element 50, the grating period and the grating height are constant. Further, for example, upon satisfaction of the conditions for total reflection described above, the incident-side diffraction element 60 may be formed into a structure corresponding to that of the emission-side diffraction element 50, and thus configured to compensate for wavelength dispersion.

Further, the light-guiding member 20 provided with the emission-side diffraction element 50 and the incident-side diffraction element 60 as described above can be configured by providing, on a front surface of a plate member composed of transparent glass having a thickness of about from 1 to 2 mm, a pattern of the plurality of grooves (slits) constituting the surface relief-type diffraction gratings RD that are to serve as the emission-side diffraction element 50 and the incident-side diffraction element 60, for example.

Details of the light guidance of the imaging light IL in the configuration described above will be described below with reference to the light paths of component lights ILa, ILb, ILc constituting the imaging light IL illustrated in FIG. 1. Note that each component light ILa, ILb, ILc represents a main beam of the light emitted from each point of the light emission surface (panel position) of the imaging light emitting device 10. Further, herein, as illustrated, of the imaging light IL, the component light ILa indicated by the dashed line and the component light ILb indicated by the dotted line are component light emitted from both end portions of the imaging light emitting device 10, and the component light ILc indicated by the solid line is the component light emitted from a center of the imaging light emitting device 10. That is, of the image of the virtual image visually recognized by the observer US, the component light ILa, ILb correspond to the component light forming the images on the peripheral sides, and the component light ILc corresponds to the component light forming the image on the central side. Further, in the illustrated example, the component light ILc is emitted in a direction along the optical axis AX, that is, parallel to the Z direction, and the component light ILa has an angle of $-\theta$ while the component light ILb has an angle of $+\theta$ using the component light ILc as reference.

At incidence in the light-incident portion 21, that is, by the diffraction action of the incident-side diffraction element 60, of the component light ILa, ILb, ILc, the component light ILa has the greatest angle of propagation through the light-guiding member 20, the component light ILb has the smallest angle of propagation through the light-guiding member 20, and the component light ILc has an intermediate angle of propagation through the light-guiding member 20. Accordingly, of these, the component light ILa has the greatest interval of incidence on the light emission surface SO (interval of hitting the light emission surface SO) and the least number of emissions from the light emission surface SO. On the other hand, the component light ILb has the smallest interval of incidence on the light emission surface SO, and the greatest number of emissions from the light emission surface SO.

Further, in the mode described above, an emission angle $\varphi$ at the light emission surface SO of each component light ILa, ILb, ILc is the same as the incident angle to the incident-side diffraction element 60. That is, the component light ILa is emitted at an emission angle $\varphi$ of $-\theta$, the component light ILb is emitted at an emission angle $\varphi$ of $\theta$, the component light ILc is emitted at an emission angle $\varphi$ of 0°, and light having an angle range of from $-\theta$ to $+\theta$ is emitted from the entire light emission surface SO provided with the emission-side diffraction element 50. Further, the range of this emission angle $\varphi$ indicates the angle of view of the image to be visually recognized. Conversely, the range in which the light within the range of the emission angle $\varphi$ passes is a range of the eye-box EB, which is the region where the observer US can visually recognize the virtual image as an image. Accordingly, by setting the range in which the emission-side diffraction element 50 is provided to a certain degree or greater, it is possible to secure a sufficiently wide eye-box EB.

By including a sufficiently wide eye-box EB, even when, for example, a distance between the left and right eyes EY1, EY2, that is, the eye distance, differs depending on the observer US as illustrated in states ∝1 to ∝3 in FIG. 2, the image (virtual image) can be visually recognized without individually adjusting an eye distance of the virtual image display device 100 for each observer US. That is, in a case in which the observer US having a standard eye distance as illustrated in the state ∝1 is assumed, with the left and right eyes EY1, EY2 aligned in a central position of the eye-box EB, the eye-box EB having a region of, for example, several millimeters or greater on the left and right is prepared, thereby making it possible to secure visibility even in a case of observation by, for example, the observer US having a wide eye distance as illustrated in the state ∝2 and, conversely, by the observer US having a narrow eye distance as illustrated in the state ∝3.

On the other hand, in the configuration described above, in order to enlarge the eye-box EB, it is necessary to enlarge the emission-side diffraction element 50, that is, to perform a greater number of repetitions of partially reflecting and partially extracting (extracting by diffraction) the imaging light IL at the light emission surface SO. However, depending on the image extraction method, brightness unevenness and color unevenness may occur depending on the angle of view, that is, the range of the emission angle φ (from −θ to +θ). Further, there is also a possibility that brightness unevenness and color unevenness will occur due to differences in the positions of the eyes EY (differences in eye width), which differ for each observer US.

In contrast, in this exemplary embodiment, in the imaging light emitting device 10, light polarized in the direction of low diffraction efficiency in the emission-side diffraction element 50 is emitted as the imaging light IL, thereby setting the light amount difference between the first component light ILc emitted as the central image at the first angle (φ=0°) and the second component light ILa, ILb emitted as peripheral images at the second angle (φ=−θ,+θ) to within 20%. As a result, it is possible to suppress the occurrence of a light amount difference between the first component light ILc and the second component light ILa, ILb, suppress brightness unevenness and color unevenness of the entire screen by the position within the screen visually recognized as an image (virtual image), and thus present a favorable image.

Furthermore, the emission-side diffraction element 50 is configured to set a light amount difference between, of the first component light ILc, a component light ILc1 passing through a first end EG1 of the eye-box EB and a component light ILc2 passing through a second end EG2 of the eye-box EB to within 20%, thereby suppressing the occurrence of brightness unevenness and color unevenness caused by differences in the positions of the eyes EY, that is, differences in individual differences in eye distance, which differ for each observer US.

Figure 3:
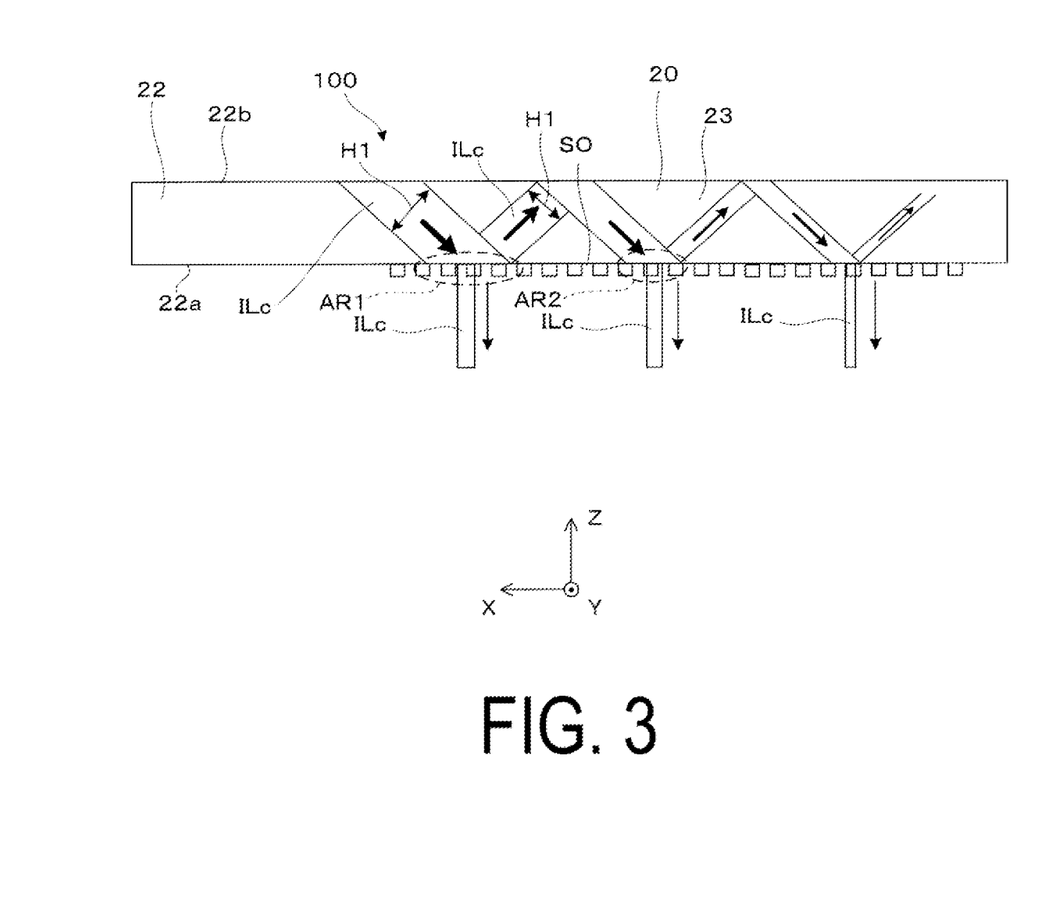
FIG. 3 is a conceptual plan view for describing an emission state of light.

Below, as a description of a configuration for facilitating a mode such as described above, a more specific example of an emission state of the imaging light IL in the virtual image display device 100 according to this exemplary embodiment will be described with reference to FIG. 3 and the like. FIG. 3 is a plan view conceptually illustrating an emission state of the first component light ILc as an example of the imaging light IL. Note that, in the illustration, for ease of explanation, the amount of the first component light ILc is expressed by a width H1. Accordingly, the width H1 does not indicate a width of a luminous flux of the actual first component light ILc.

When the first component light ILc is incident on the emission-side diffraction element 50 (for example, incident on a first region AR1 of the emission-side diffraction element 50), only a portion of the incident light amount having a transmitted 1st-order diffraction efficiency is extracted to the outside in the first region AR1, and a portion having a zero-order reflection efficiency is returned to inside the light-guiding member 20. Note that, in the example illustrated, the width H1 is slightly narrowed after incidence on the first region AR1 and a portion of the light is emitted from the first region AR1, showing this state.

The first component light ILc returned to the light-guiding member 20 is reflected by a back surface, that is, a surface of an extension of the flat surface 22b, of the light-guiding member 20, and then is incident again on the emission-side diffraction element 50 (incident on a second region AR2 of the emission-side diffraction element 50). In the second region AR2 as well, only the portion of the incident light amount having a transmitted 1st-order diffraction efficiency is extracted to the outside, and the portion having a zero-order reflection efficiency is returned to inside the light-guiding plate. With repetition of such a process, as the light is propagated in the light-guiding plate, the light is extracted to the outside in small increments. Further, the diffraction efficiencies of the 2nd order and higher are small enough to be negligible.

Here, as described above, as the imaging light IL that has propagated through the light-guiding member 20, that is, as the first component light ILc, light polarized in the direction of low diffraction efficiency in the emission-side diffraction element 50 is incident. That is, in a mode such as described above, a proportion of the first component light ILc extracted by each diffraction, such as those of the first region AR1 and the second region AR2, is reduced. Therefore, for example, the difference between the light amount of the first component light ILc extracted in the first region AR1 and the light amount of the first component light ILc extracted in the second region AR2 is also reduced. Further, the above is not limited to the first component light ILc of the imaging light IL, and the same applies to the second component light ILa and the like, which are the other component light. That is, for the imaging light IL as a whole, there is little change in brightness and color due to differences in the positions of the eyes EY, that is, differences in individual differences in eye distance.

Figure 4:
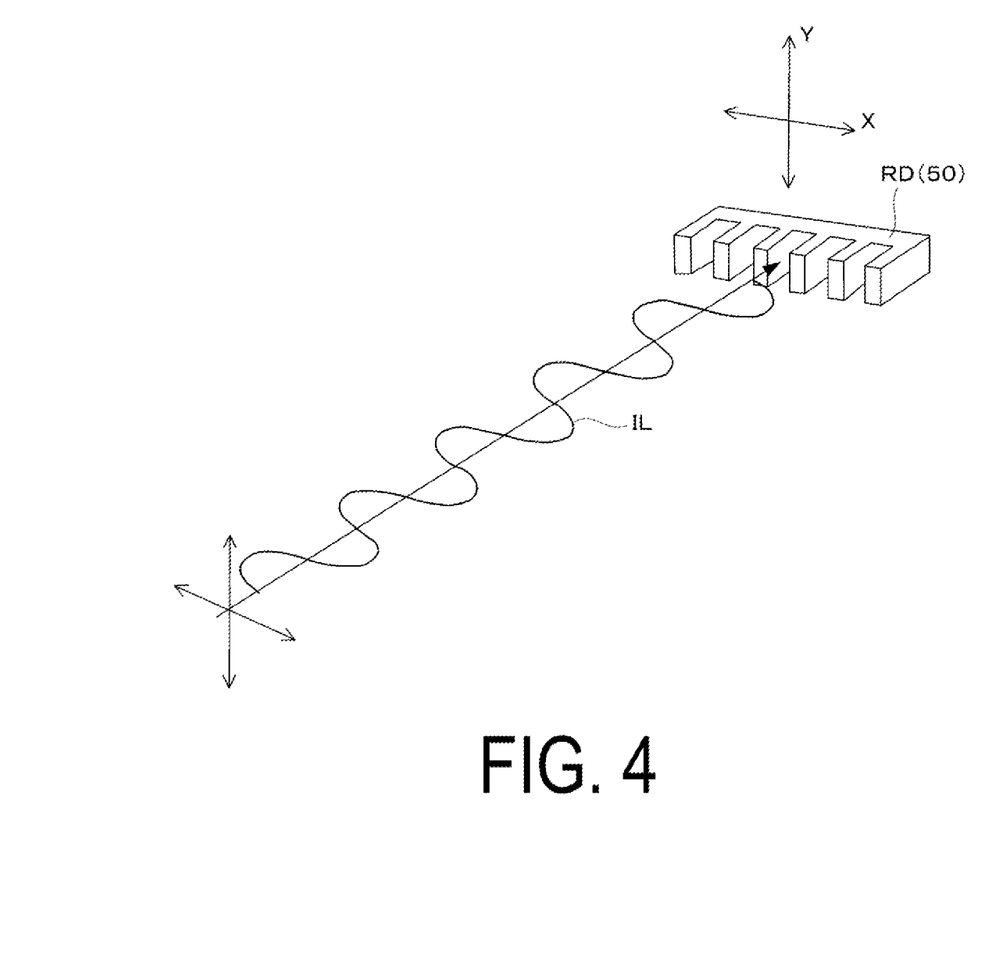
FIG. 4 is a conceptual perspective view for describing a polarized state of light.

The polarization of light incident on the emission-side diffraction element 50 and its characteristics will be described below with reference to FIG. 4. Here, as an example of the emission-side diffraction element 50, the surface relief-type diffraction grating RD is adopted as described above. The surface relief-type diffraction grating RD has periodicity in the X direction and is provided with a linear pattern formed by a large number of grooves (slits) extending in the Y direction. Here, a direction parallel to the linear pattern formed by the grooves (in the illustrated example, the ±Y direction) is referred to as a groove direction of the surface relief-type diffraction grating RD as described above. In contrast, as illustrated, the imaging light IL incident on the surface relief-type diffraction grating RD is a polarized transverse magnetic (TM) wave (p-wave) and thus has an electric field component that oscillates in a direction orthogonal to the groove direction of the surface relief-type diffraction grating RD. That is, the imaging light IL is linearly polarized light forming a TM wave (p-wave) with respect to the surface relief-type diffraction grating RD or including the linearly polarized light as the main component light, making it possible to lower the diffraction efficiency of the surface relief-type diffraction grating RD, that is, the emission-side diffraction element 50, and thus suppress a light amount difference caused by the emission position or the emission angle in comparison to a case in which the imaging light IL is constituted by a transverse electric (TE) wave (s-wave) only or includes a greater amount of TE waves (s-waves). Further, in order to bring the imaging light IL into such a polarized state, the polarized state is adjusted in the imaging light emitting device 10, for example. That is, the imaging light emitting device 10 constituted by a liquid crystal display panel or the like emits the imaging light IL in a state of being polarized and thus has an electric field component that oscillates in the direction orthogonal to the groove direction of the surface relief-type diffraction grating RD.

Below, an example of the emission state of the imaging light IL set to a mode such as described above will be described with reference to FIG. 5.

Figure 5:
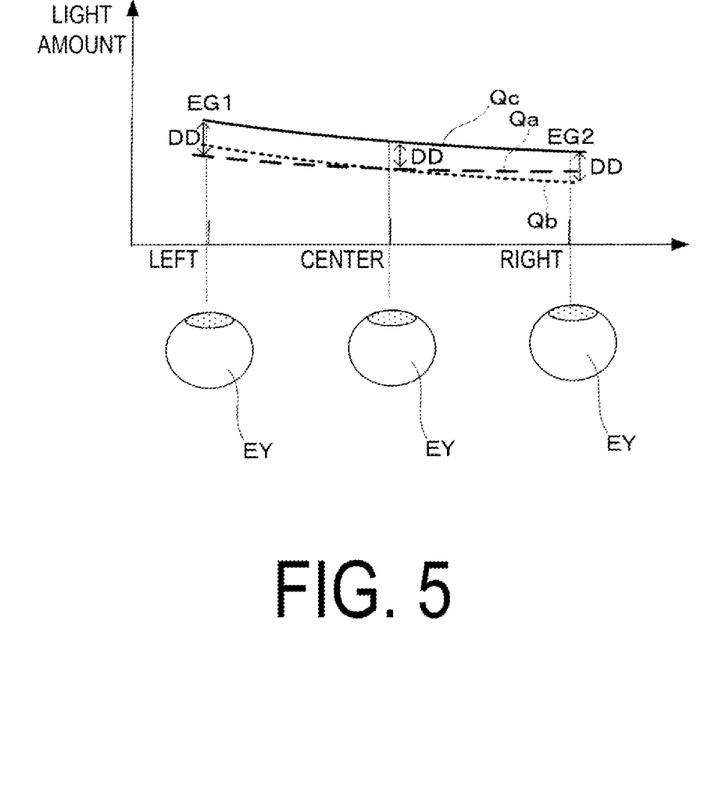
FIG. 5 is a conceptual graph showing positions of the eye and, for each direction of light, a light amount emitted.

FIG. 5 is a conceptual graph showing the positions of the eye EY and, for each direction of the imaging light IL, a light amount emitted. FIG. 5 illustrates a case in which light in a green wavelength band is used as an example of imaging light IL. In the graph, the horizontal axis indicates the position of the eye EY, that is, where the eye EY is in the eye-box EB (refer to the position of the left eye EY1 in FIG. 2) and the vertical axis indicates the amount of the imaging light IL at each position. Here, the center and both ends of the eye-box EB (ends EG1, EG2 in FIG. 1 and FIG. 2) are compared. Further, in the graph, a curve Qa indicated by the dashed line corresponds to the amount of the component light ILa of the imaging light IL, a curve Qb indicated by the dotted line corresponds to the amount of the component light ILb, and a curve Qc indicated by the solid line corresponds to the amount of the component light ILc. That is, the curve Qc indicates the light amount, that is, the brightness sensed by the eye EY, at a central position (central image) of the screen due to the virtual image, and the curves Qa, Qb indicate the light amounts, that is, the brightness sensed by the eye EY, at peripheral positions (peripheral images) of the screen. Note that the emission angle φ of the component light ILc is 0°, and the emission angles φ of the component light ILa, ILb are ±θ=±10°.

In this exemplary embodiment, as illustrated by the curves Qa, Qb, Qc, regardless of the position of the eye EY in the eye-box EB, the light amount of the central image indicated by the curve Qc is the highest, but the differences from the light amounts of the peripheral images indicated by the curves Qa, Qb are small and, specifically, a light amount difference DD between these is within 20% given 100% as the value of the light amount of the curve Qc, for example. Note that, although illustrations and the like are omitted, the conditions described above are satisfied when the emission angle θ is within the range of 0°±10°. In this case, the brightness sensed by the eye EY can be suppressed to the extent that no difference is sensed from the central side to the peripheral sides.

Further, as can be seen from the degree of inclination of the curves Qa, Qb, Qc, the differences in the light amount due to the position of the eye EY is also reduced. Here, with regard to the values of the curves Qa, Qb, Qc, the first end EG1 of the eye-box EB is the highest and the second end EG2 is the lowest, but with regard to the difference at this time, given 100% as the value of the light amount of the first end EG1 in the curve Qc, that is, in the first component light ILc, for example, the difference between the light amount at the first end EG1 and the light amount at the second end EG2 is within 20%.

Note that the example above describes a case in which the light in the green wavelength band is used, but a case in which light in a wavelength band including other color light and a color image is formed by combining these can be similarly handled. In this case, it is also conceivable to satisfy the conditions described above for each color, and it is also conceivable to satisfy the conditions described above for the color image as a whole.

As described above, the virtual image display device 100 according to this exemplary embodiment includes the imaging light emitting device 10, the light-guiding member 20 configured to guide the imaging light IL emitted from the imaging light emitting device 10, and the emission-side diffraction element 50 provided at the light-emitting portion 23 of the light-guiding member 20 and configured to emit the imaging light IL by diffraction. In the emission-side diffraction element 50, the light amount difference between the first component light ILc and the second component light ILa, ILb of the imaging light IL, the first component light ILc being emitted as the central image at the first angle φ of 0° and the second component light ILa, ILb being emitted as peripheral images at the second angle φ of ±θ (θ>0°), is equal to or less than 20%.

In the virtual image display device 100 described above, the emission-side diffraction element 50 sets the light amount difference between the first component light ILc emitted at the first angle φ of 0° and the second component light ILa, ILb emitted at the second angle φ of ±θ to within 20% while widely securing the eye-box EB, which is the region where the observer US can visually recognize a virtual image, thereby making it possible to suppress the occurrence of a light amount difference caused by the position within the screen visually recognized as a virtual image, suppress brightness unevenness and color unevenness of the screen as a whole, and thus present a favorable image. Further, in the virtual image display device 100 described above, the light amount difference caused by the emission position and the emission angle is suppressed by emitting, as the imaging light IL, light polarized in the direction of low diffraction efficiency in the emission-side diffraction element 100. More specifically, in virtual image display device 100 described above, in the imaging light emitting device 10, the emission-side diffraction element 50 is constituted by the surface relief-type diffraction grating RD, and the imaging light IL is emitted in a state of being polarized and thus has an electric field component that oscillates in the direction orthogonal to the groove direction of the surface relief-type diffraction grating RD, thereby reducing the diffraction efficiency.

Figure 6:
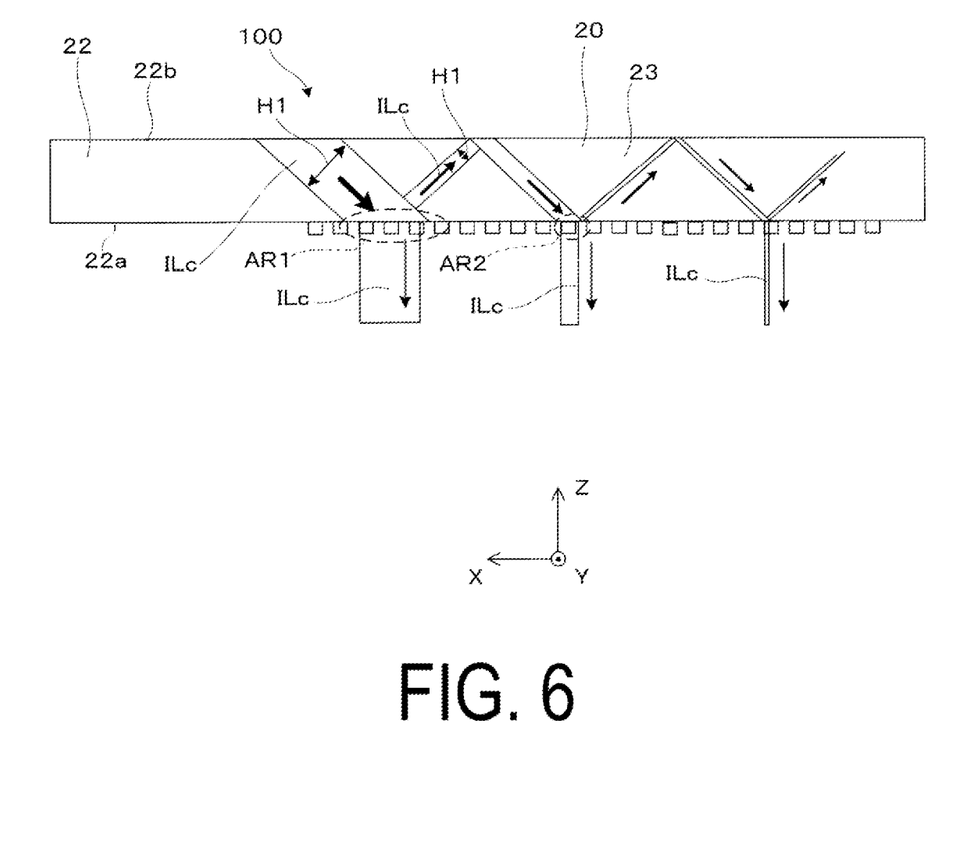
FIG. 6 is a conceptual plan view for describing an emission state of light in a comparative example.
Figure 7:
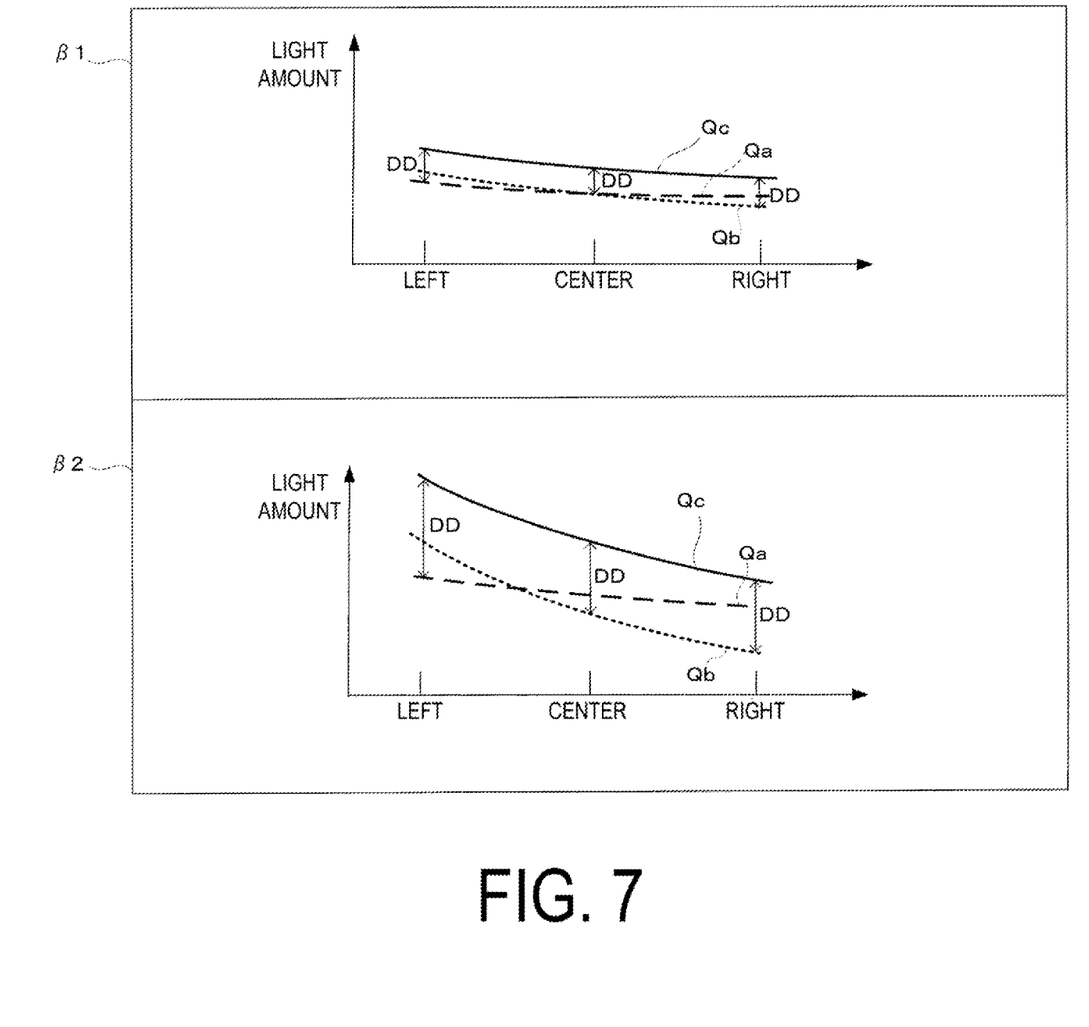
FIG. 7 shows graphs for comparing light amounts emitted.

Below, a comparative example will be described with reference to FIG. 6 and the like. FIG. 6 is a conceptual plan view for describing an emission state of light in the comparative example, and corresponds to FIG. 3. Further, FIG. 7 is a graph for comparing the light amounts emitted, and compares the example illustrated in FIG. 5 and the graph of the case of the comparative example shown in FIG. 6. Specifically, the graph shown in the upper area β1 corresponds to FIG. 5, whereas the graph shown in the bottom area β2 is a graph for the case of the comparative example described above. Note that, in the comparative example described above, the conditions excluding the polarized state of the imaging light IL, that is, the optical configuration and the like, are the same as those in the exemplary embodiment described above, and descriptions thereof will be omitted.

In this exemplary embodiment, as described with reference to the illustrated example in FIG. 5, the imaging light IL is linearly polarized light forming a TM wave (p-wave) with respect to the surface relief-type diffraction grating RD or including the linearly polarized light as the main component light, thereby lowering the diffraction efficiency of the surface relief-type diffraction grating RD, that is, the emission-side diffraction element 50. In contrast, in the comparative example, the imaging light IL is linearly polarized light forming a TE wave (s-wave) with respect to the surface relief-type diffraction grating RD or including the linearly polarized light as the main component light, that is, the imaging light IL is in a state of being polarized and thus has an electric field component that oscillates in a direction parallel to the groove direction of the surface relief-type diffraction grating RD, causing the diffraction efficiency to be higher than that in the example described above of the exemplary embodiment. From a different point of view, this comparative example differs from the example described above in that the imaging light emitting device 10 is configured to emit, as the imaging light IL, polarized light in a direction of high diffraction efficiency in the emission-side diffraction element 50. In this case, as the light amount of the first component light ILc is illustrated as the width H1 in FIG. 6, the amount of the first component light ILc extracted to the outside at a single incidence on the emission-side diffraction element 50 increases and, for example, the width H1 suddenly narrows after incidence on the region AR1, resulting in a greater difference from the light amount extracted at the incidence of the next region AR2. This is the same for the other component light ILa and the like and, as a result, for example, the curves Qa, Qb, Qc for the light amounts become like those in the graph shown in the lower area β2 of FIG. 7. That is, in comparison to the graph corresponding to FIG. 5 illustrated in the upper area β1, in the case of the comparative example described above, the light amount difference DD between the light amount of the central image indicated by the curve Qc and the light amounts of the peripheral images indicated by the curves Qa, Qb is greater, and given 100% as the value of the light amount of the curve Qc, for example, the light amount difference DD exceeds 20%. Further, for the values of the curves Qa, Qb, Qc as well, for example, given 100% as the value of the light amount of the first end EG1 in the curve Qc, that is, in the first component light ILc, representing the central image, the difference between the light amount at the first end EG1 and the light amount at the second end EG2 exceeds 20%.

In such a case, regardless of the positions of the eyes EY in the eye-box EB, there is a possibility of a (noticeable) occurrence of brightness unevenness and color unevenness of the screen as a whole due to light amount differences between the central image and the peripheral images and, depending on the positions of the eyes EY, that is, the eye distance of the observer US, the image may appear bright or dark.

In this exemplary embodiment, as described above, the imaging light IL is light polarized in the direction of a low diffraction efficiency in the emission-side diffraction element 50, thereby avoiding such a situation.

Second Exemplary Embodiment

Below, a virtual image display device according to second exemplary embodiment will be described with reference to FIG. 8. Note that a virtual image display device 200 according to this exemplary embodiment is a modified example of the virtual image display device 100 according to the first exemplary embodiment and is the same as the first exemplary embodiment except for an imaging light emitting device 210, and thus detailed descriptions of the other components will be omitted.

Figure 8:
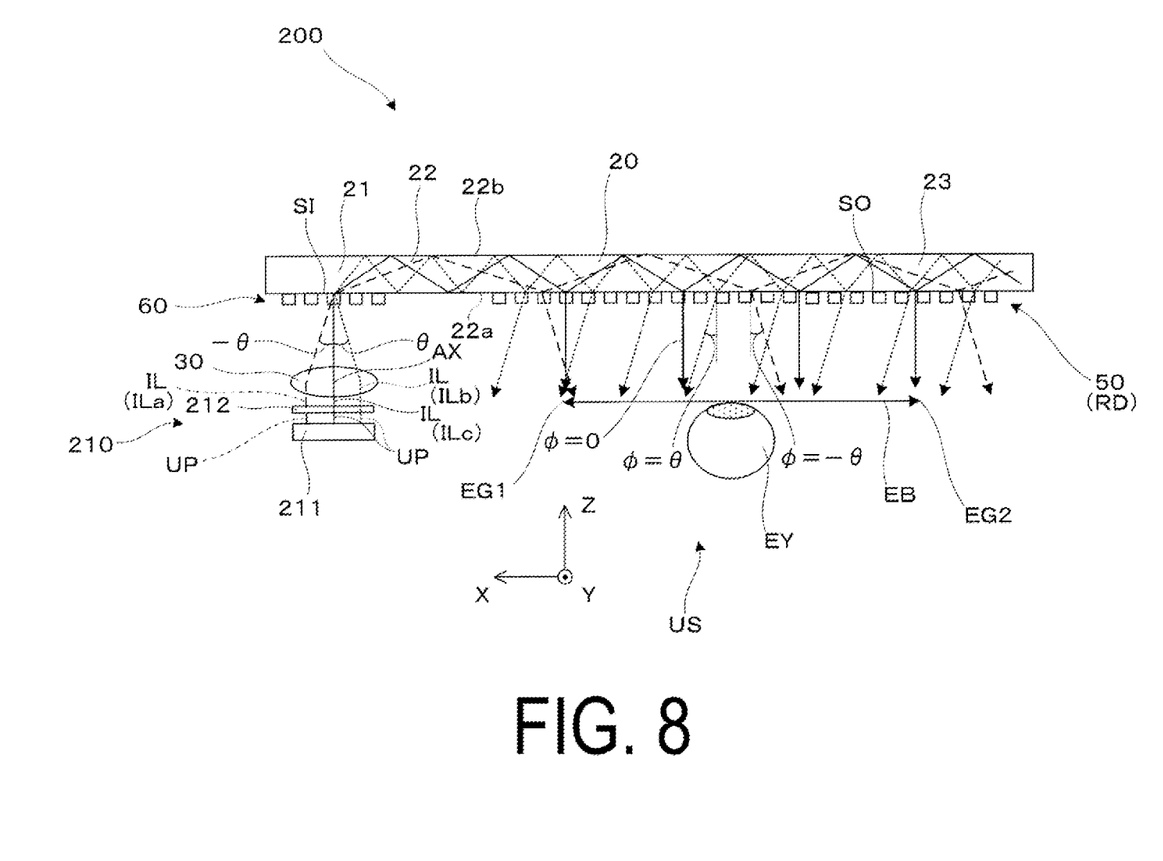
FIG. 8 is a conceptual plan view illustrating an optical configuration of a virtual image display device according to a second exemplary embodiment.

FIG. 8 is a schematic view illustrating an optical configuration of the virtual image display device 200 according to this exemplary embodiment, and corresponds to FIG. 1.

In the first exemplary embodiment, the configuration includes the imaging light emitting device 10 constituted by a liquid crystal display (liquid crystal display panel) or the like capable of emitting imaging light in a polarized state, that is, a polarized display element (polarized display device) that emits polarized light as the imaging light IL. Alternatively, this exemplary embodiment differs from the first exemplary embodiment in that the imaging light emitting device 210 including a non-polarized display element that emits non-polarized light is provided, as illustrated.

More specifically, the imaging light emitting device 210 includes a non-polarized display element 211 configured to emit non-polarized light UP, and a polarizing element 212 configured to polarize the non-polarized light UP from the non-polarized display element 211 and emit the polarized light as the imaging light IL.

Examples of the non-polarized display element 211, that is, the non-polarized display, include an organic electroluminescent (EL) display and a micro light-emitting diode (LED) display. A non-polarized display such as described above, when utilized as-is, radiates the imaging light IL having both component light that becomes a TE wave (s-wave) and component light that becomes a TM wave (p-wave) with respect to the emission-side diffraction element 50, that is, the TE wave having a high diffraction efficiency at the emission-side diffraction element 50 is included. To avoid this, a light-guiding plate or polarization beam splitter for removing the TE wave and passing the TM wave is provided as the polarizing element 212 between the non-polarized display element 211 and the collimator lens 30.

Further, in the example described above, description is made of a non-polarized display device in the imaging light emitting device 210. In addition, however, even in a case in which the display device is a liquid crystal display or a polarized display device that uses a laser, for example, it is assumed that there are also cases in which, due to restrictions on the layout of the optical system and the like, only TE waves (s-waves) with a high diffraction efficiency can be radiated to the emission-side diffraction element 50. In this case, in FIG. 8, it is conceivable that, by adoption of a polarized display device instead of the non-polarized display element 211 and adoption of a λ/2 plate as the polarizing element 212, the polarization plane is rotated 90 degrees, causing the imaging light IL to form a TM wave (p-wave).

Even in the virtual image display device 200 according to this exemplary embodiment, the occurrence of a light amount difference in the imaging light IL by the position within the screen visually recognized as a virtual image is suppressed, and brightness unevenness and color unevenness of the screen as a whole can be suppressed, making it possible to present a favorable image.

Modifications and Other Matters

The structure described above is exemplary, and various changes can be made to the extent that similar functions can be achieved.

For example, in the above, there are only two surface relief-type diffraction gratings formed on the light-guiding member 20, namely, the incident-side diffraction element 60 serving as an input diffraction grating and the emission-side diffraction element 50 serving as an output diffraction grating, and the grating grooves thereof are parallel to each other. Nevertheless, no such limitation is intended and, even in a case in which there are three or more diffraction gratings formed on the light-guiding member 20 and the grating grooves are angled with respect to one another, a virtual image with minimal color unevenness can be observed as long as the imaging light IL incident on the emission-side diffraction element 50 is a TM wave (p-wave).

Figure 9:
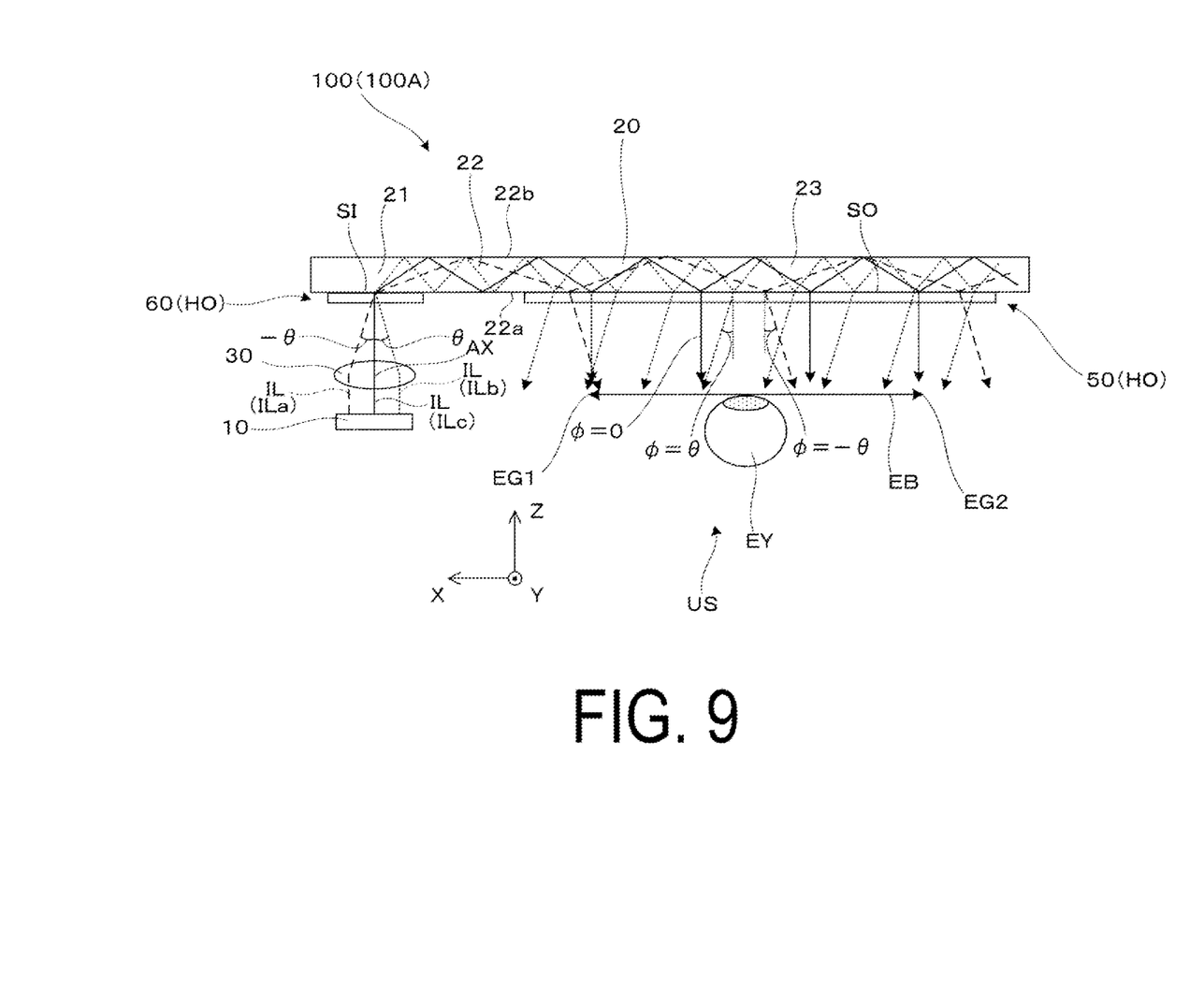
FIG. 9 is a schematic plan view illustrating another example of an optical configuration of the virtual image display device.

Further, as illustrated in FIG. 9, for the emission-side diffraction element 50 and the incident-side diffraction element 60, it is also conceivable to adopt a volume hologram HO in place of the output diffraction grating. Note that, even in a case in which the volume hologram HO is adopted in the emission-side diffraction element 50, a direction in which the diffraction efficiency is decreased exists in the same manner as in the case of the surface relief-type diffraction grating, and the same effects as those described above can be obtained by emitting the imaging light IL in a polarized state in accordance with the direction.

Further, in the description above, in the example illustrated in FIG. 5, for example, the first angle φ, which is the emission angle of the first component light ILc of the central image, is 0°, and the second angle φ, which is the emission angle of the second component light ILa, ILb of the peripheral images is ±10°, that is, 10° (that is, the total angle of view in the horizontal direction is 20°). However, no such limitation is intended and, for example, the angle difference may be 10° or greater.

Further, in the description above, as the imaging light emitting devices 10, 210, a liquid crystal display panel, an organic EL display panel, or the like is applied, but no such limitation is intended, and the device may be a self-light-emitting display element represented by an LED array, a laser array, a quantum dot light-emitting element, or the like. Further, the imaging light emitting devices 10, 210 may have a configuration that uses a digital micromirror device (DMD) or may be a display element that forms imaging light by micro-electromechanical systems (MEMS). Furthermore, the imaging light emitting device 10 and the like may be constituted by a display that uses a laser scanner obtained by combining a laser light source and a scanner. Note that liquid crystal on silicon (LCOS) technology may be used instead of the liquid crystal display panel.

Further, in the description above, the virtual image display device 100 and the like can be utilized as a head-mounted display (HMD), but no such limitation is intended. The disclosure of this application can be applied to various optical apparatuses, and can be applied to, for example, a head-up display (HUD).

Further, in the description above, the see-through type virtual image display device for visually recognizing an external world image (actual objects) and the virtual image in an overlapping manner has been described, but no such limitation is intended. The device may be adopted for visually recognizing a so-called closed type virtual reality, or may be compatible with a so-called video see-through product constituted by a display and an imaging device.

Further, in the exemplary embodiments described above, a configuration has been illustrated in which the virtual image display device 100 is disposed on the temporal side of the observer US, that is, next to the face of the observer US, but no such limitation is intended. For example, this application may be applied to a configuration in which portions constituting the virtual image display device 100 are disposed along an upper side of the eyes EY of the observer US (the forehead of the observer US) to guide the imaging light IL from above the eye EY. Further, when the direction in which the imaging light IL is guided is the vertical direction as described above, the groove direction of the emission-side diffraction element 50 may be changed as appropriate and, in conjunction, the polarization direction of the imaging light IL emitted from the imaging light emitting device 10 may be changed, for example.

Further, in the description above, the optical axis AX is configured to be perpendicular to the optical member 20 having a flat plate shape, but no such limitation is intended, and conceivably the optical axis AX may be formed in an oblique direction, that is, the imaging light IL may be configured to be incident from an oblique direction.

As described above, a first virtual image display device according to a specific aspect includes an imaging light emitting device, a light-guiding member configured to guide imaging light emitted from the imaging light emitting device, and an emission-side diffraction element provided at a light-emitting portion of the light-guiding member and configured to emit the imaging light by diffraction. In the emission-side diffraction element, a light amount difference between a first component light and a second component light of the imaging light, the first component light being emitted as a central image at a first angle and the second component light being emitted as a peripheral image at a second angle, is equal to or less than 20%.

In the virtual image display device described above, the emission-side diffraction element sets the light amount difference between the first component light emitted at the first angle and the second component light emitted at the second angle to within 20% while widely securing a region (eyebox) where the observer can visually recognize an image (virtual image), thereby making it possible to suppress the occurrence of a light amount difference caused by the position within the screen visually recognized as an image (virtual image), suppress brightness unevenness and color unevenness of the screen as a whole, and thus present a favorable image.

In a specific aspect, the imaging light emitting device emits, as the imaging light, light polarized in a direction in which diffraction efficiency in the emission-side diffraction element is low. In this case, light polarized in the direction of low diffraction efficiency in the emission-side diffraction element is emitted as the imaging light, thereby making it possible to suppress the light amount difference caused by the emission position and the emission angle.

In another aspect, the imaging light emitting device emits, as the imaging light, light that becomes a transverse magnetic (TM) wave with respect to the emission-side diffraction element. In this case, a TM wave with respect to the emission-side diffraction element is used, thereby suppressing diffraction efficiency, that is, suppressing an emission amount of the imaging light emitted by diffraction, and thus making a light amount difference less likely to occur.

In yet another aspect, the imaging light emitting device includes a non-polarized display element configured to emit non-polarized light, and a polarizing element configured to polarize the non-polarized light from the non-polarized display element and emit the polarized light as the imaging light. In this case, by setting the light from the non-polarized display element to the desired polarization state in the polarizing element, it is possible to suppress the light amount difference caused by the emission position and the emission angle of the imaging light in the emission-side diffraction element.

In yet another aspect, the imaging light emitting device includes a polarized display element configured to emit polarized light as the imaging light. In this case, the polarized display element can adjust the imaging light to a desired polarization state in the emission-side diffraction element.

In yet another aspect, the emission-side diffraction element is a surface relief-type diffraction grating. In this case, diffraction for carrying out the intended light guidance can be produced with a simple structure.

In yet another aspect, the surface relief-type diffraction grating has a grating period and a grating height that are constant. In this case, a surface relief-type diffraction grating having a precise diffraction efficiency can be configured with a simple structure.

In yet another aspect, the emission-side diffraction element is a hologram element. In this case as well, brightness unevenness and color unevenness of the screen as a whole is suppressed, making it possible to present a favorable image.

In yet another aspect, the emission-side diffraction element is configured so that a light amount difference between a component light passing through a first end of an eye-box and a component light passing through a second end of the eye-box, of the first component light, is 20% or less. In this case, brightness unevenness and color unevenness caused by differences in the positions of the eyes EY, that is, differences in individual eye distance, which differ for each observer US, can be suppressed.

In yet another aspect, the light-guiding member includes a light-incident portion configured to guide the imaging light emitted from the imaging light emitting device into an interior of the light-guiding member, and a light-guiding portion configured to propagate the imaging light incident from the light-incident portion to the light-emitting portion by total reflection. In this case, the light-incident portion, the light-guiding portion, and the light-emitting portion utilize total reflection in the light-guiding member, making it possible to reliably and highly efficiently propagate the imaging light from the imaging light emitting device to an area in front of the eyes of the observer.

In yet another aspect, in the emission-side diffraction element, an angle difference between the first angle and the second angle is greater than or equal to 10°. In this case, favorable image formation with reduced brightness unevenness and color unevenness can be achieved while maintaining an image having a wide angle of view.

A second virtual image display device according to a specific aspect includes an imaging light emitting device, a light-guiding member configured to guide imaging light emitted from the imaging light emitting device, and an emission-side diffraction element provided at a light-emitting portion of the light-guiding member. The imaging light emitting device is configured to emit, as the imaging light, light polarized in a direction in which diffraction efficiency in the emission-side diffraction element is low.

In the virtual image display device described above, light polarized in the direction of low diffraction efficiency in the emission-side diffraction element is emitted as the imaging light while the eye-box is widely secured by the emission-side diffraction element, thereby making it possible to suppress the light amount difference caused by the emission position and the emission angle and suppress brightness unevenness and color unevenness within the screen visually recognized as a virtual image.

A third virtual image display device according to a specific aspect includes an imaging light emitting device, a light-guiding member configured to guide imaging light emitted from the imaging light emitting device, and an emission-side diffraction element provided at a light-emitting portion of the light-guiding member. The emission-side diffraction element is a surface relief-type diffraction grating, and the imaging light emitting device is configured to emit the imaging light in a polarized state and thus cause the imaging light to have an electric field component that oscillates in a direction orthogonal to a groove direction of the surface relief-type diffraction grating.

In the virtual image display device described above, the imaging light emitting device emits the imaging light in a polarized state while the eye-box is widely secured by the emission-side diffraction element, and thus causes the imaging light to have, with respect to the emission-side diffraction element, which is the surface relief diffraction element, an electric field component that oscillates in a direction orthogonal to a groove direction of the surface relief-type diffraction grating, making it possible to reduce the diffraction efficiency, suppress the light amount difference caused by the emission position and the emission angle, and suppress brightness unevenness and color unevenness within the screen visually recognized as a virtual image.

What is claimed is:

1. A virtual image display device comprising:
   an imaging light emitting device configured to emit imaging light;
   a light-guiding member configured to guide the imaging light emitted from the imaging light emitting device; and
   a diffraction element provided at an emitting portion of the light-guiding member emitting the imaging light and configured to emit the imaging light by diffraction, wherein
   in the diffraction element, a light amount difference between a first component light of the imaging light and a second component light of the imaging light is equal to or less than 20%, the first component light being emitted at a first angle, and the second component light being emitted at a second angle different from the first angle,
   the diffraction element has a central portion and a peripheral portion, the central portion emitting a part of the imaging light and diffracting another of the imaging light, and the peripheral portion emitting a part of the imaging light diffracted by the central portion, and
   in the diffraction element, a light amount difference between a first light and a second light of the imaging light is equal to or less than 20%, the first light being emitted from the central portion, the second light being emitted from the peripheral portion.

2. The virtual image display device according to claim 1, wherein
   the imaging light emitting device emits, as the imaging light, polarized light in a direction in which diffraction efficiency by the diffraction element is low.

3. The virtual image display device according to claim 2, wherein
   the imaging light emitting device emits, as the imaging light, light that is a transverse magnetic (TM) wave with respect to the diffraction element.

4. The virtual image display device according to claim 1, wherein
   the imaging light emitting device includes a non-polarized display element and a polarizing element, the non-polarized display element emitting non-polarized light, the polarizing element polarizing the non-polarized light from the non-polarized display element, the polarizing element emitting the polarized light as the imaging light.

5. The virtual image display device according to claim 1, wherein
   the imaging light emitting device includes a polarized display element emitting polarized light as the imaging light.

6. The virtual image display device according to claim 1, wherein
   the diffraction element is a surface relief-type diffraction grating.

7. The virtual image display device according to claim 6, wherein
in surface relief-type diffraction grating, a grating period is constant and a grating height is constant.

8. The virtual image display device according to claim 1, wherein
the diffraction element is a hologram element.

9. The virtual image display device according to claim 1, wherein
the diffraction element is configured so that a light amount difference between a component light passing through a first end of an eye-box and a component light passing through a second end of the eye-box, of the first component light, is 20% or less.

10. The virtual image display device according to claim 1, wherein
the light-guiding member has a incident portion and a light-guiding portion, the incident portion on which the imaging light emitted from the imaging light emitting device is incident, the light-guiding portion guiding the imaging light from the incident portion to the emitting portion by total reflection.

11. The virtual image display device according to claim 1, wherein
the diffraction element is configured so that an angle difference between the first angle and the second angle is greater than or equal to 10°.

12. A virtual image display device comprising:
an imaging light emitting device configured to emit imaging light;
a light-guiding member configured to guide the imaging light emitted from the imaging light emitting device; and
an diffraction element provided at a light-emitting portion of the light-guiding member, wherein
the imaging light emitting device emits, as the imaging light, polarized light in a direction in which diffraction efficiency by the diffraction element is low,
the diffraction element has a central portion and a peripheral portion, the central portion emitting a part of the imaging light and diffracting another of the imaging light, and the peripheral portion emitting a part of the imaging light diffracted by the central portion, and
in the diffraction element, a light amount difference between a first light and a second light of the imaging light is equal to or less than 20%, the first light being emitted from the central portion, the second light being emitted from the peripheral portion.

13. A virtual image display device comprising:
an imaging light emitting device configured to emit imaging light;
a light-guiding member configured to guide the imaging light emitted from the imaging light emitting device; and
an diffraction element provided at an emitting portion of the light-guiding member, wherein
the diffraction element is a surface relief-type diffraction grating and
the imaging light emitting device emits the imaging light in a polarized state having an electric field component that oscillates in a direction intersecting a groove direction of the surface relief-type diffraction grating,
the diffraction element has a central portion and a peripheral portion, the central portion emitting a part of the imaging light and diffracting another of the imaging light, and the peripheral portion emitting a part of the imaging light diffracted by the central portion, and
in the diffraction element, a light amount difference between a first light and a second light of the imaging light is equal to or less than 20%, the first light being emitted from the central portion, the second light being emitted from the peripheral portion.

* * * * *